United States Patent
Lang et al.

(10) Patent No.: US 6,954,520 B1
(45) Date of Patent: Oct. 11, 2005

(54) METHOD FOR DETERMINING CONCURRRENT VOICE OVER IP CALLS

(75) Inventors: Howard L. Lang, Holmdel, NJ (US); Eric M. Woerner, Burlington Township, NJ (US); Jaap Voets, Maarssen (NL)

(73) Assignee: AT&T Corp., New York, NY (US)

( * ) Notice: Subject to any disclaimer, the term of this patent is extended or adjusted under 35 U.S.C. 154(b) by 248 days.

(21) Appl. No.: 10/403,178

(22) Filed: Mar. 28, 2003

(51) Int. Cl.⁷ ............................................. H04M 15/00
(52) U.S. Cl. ...................... 379/137; 379/133; 379/139; 379/112.06; 370/493
(58) Field of Search ..................... 379/112.01, 112.06, 379/112.07, 114.01, 126, 133, 134, 137, 139; 370/493, 495, 496

(56) References Cited

U.S. PATENT DOCUMENTS

| | | | |
|---|---|---|---|
| 5,696,809 A * | 12/1997 | Voit ........................ | 379/22.01 |
| 5,999,604 A * | 12/1999 | Walter ........................ | 379/133 |
| 6,028,914 A * | 2/2000 | Lin et al. ........................ | 379/14 |
| 6,333,931 B1 * | 12/2001 | LaPier et al. ................ | 370/385 |
| 6,381,306 B1 * | 4/2002 | Lawson et al. .......... | 379/32.01 |
| 6,385,301 B1 * | 5/2002 | Nolting et al. ............ | 379/32.01 |

* cited by examiner

Primary Examiner—Quoc Tran
(74) Attorney, Agent, or Firm—Henry T. Brendzel

(57) ABSTRACT

A method employs call detail records for developing a report on the usage of VoIP calling along a network path or through a network location. By utilizing, for example, a call-beginning record and a call-ending record for each connection, a report is created of the number of concurrent VoIP calls that a specified equipment or network path carries at any given instance by retrieving batches of stored call detail records, culling the records that are relevant to the specified equipment or network path, considering the culled records in a time sorted manner, and incrementing or decrementing a counter based on whether a considered record is a call-beginning record or a call-ending record, respectively. The state of the counter is reported, illustratively, as a line entry each time the counter's state is modified.

4 Claims, 3 Drawing Sheets

METHOD FOR DETERMINING CONCURRRENT VOICE OVER IP CALLS

BACKGROUND OF THE INVENTION

This invention relates to IP telephony and, more particularly, to method and apparatus for insuring that IP telephony is carried out in a manner that is effective for customers.

Conventionally, a business enterprise's telephonic interactions with customers, providers, and branches of the enterprise are conducted through a PBX having trunks that connect the PBX trunks to the local public switched network. The local network is connected to an inter-exchange carrier's network, and to the network of international telephone service providers. The business enterprise's computer interactions are typically conducted through a corporate local area network, or wide area network, followed by a digital network (often, via a gateway) which, typically, is a packet network. This may be an Asynchronous Transfer Mode (ATM) network, an IP network, Frame Relay network, or some other network. Through software control a segregated network is sometimes created within the general-use packet network, and such segregated networks are called Virtual Private Networks (VPNs). Business enterprises often purchase such VPNs with a certain load carrying capability.

In recent years the notion of IP telephony has been making inroads into the realm of telephone communications, where telephone calls are digitized, and are carried over the same network as computer interactions. Relative to situations where a customer has resources for data communication and separate resources for voice communication, combining data and voice so that a single resource may be used sometimes has a cost advantage because resources can be utilized more efficiently. Moreover, utilizing the network that was previously dedicated for computer communications has the advantage of bypassing toll charges from inter-exchange carriers and international telephone service providers. In a business enterprise environment, this is achieved by dedicating a number of trunks of the PBX to Internet telephony, and connecting those trunks to a voice-enabled Internet router, for example, a router manufactured by Cisco Systems. The voice-enabled router includes interface circuitry that effects encoding of an analog telephone call to digital to permit transfer over the IP network, and then decoding back to analog at the receiving side. The function is bidirectional, permitting full duplex phone conversations. Since this interface circuitry is conventional, its precise structure is not relevant to the principles disclosed herein and, therefore, it is not further described herein.

FIG. 1 presents a block diagram of such an arrangement, comprising packet network 100 and PSTN 200, which illustratively, is made up of a first domestic transport network, 210, a second domestic transport network, 230, and international transport network 220. Calls between telephone 11 in New York City, for example, and telephone 15 in Sao Paulo, for example, traverse PBX 21 and networks 210, 220, and 230. More specifically, when telephone 11 wishes to establish a call to telephone 15, a process within PBX 21 decides whether the call ought to be made via PSTN 200, and if so, PBX 21 outputs the call on one of the trunks that is connected to switch 211, and thence the conventional call establishment process takes over. That is, the call is extended to switch 211 in network 210, then to international network 220, then to domestic network 230 and to switch 232 within it, and lastly to PBX 25. PBX 25 connects to telephone 15.

When the process within PBX 21 decides that the call ought to be made via packet network 100, it outputs the call on one of the trunks (22) that is connected to interface circuitry 311 in voice-enabled router 31 in, or near, the location of telephone 11, i.e., in, or near, New York City. In accordance with known voice-over-IP (VoIP) techniques a packet flow is established between interface circuitry 311 and interface circuitry 321 within voice-enabled router 32 that is in, or near, Sao Paulo, and interface circuitry 321 output signals on a trunk line 34 that connects to PBX 25.

Generally speaking, a router such as router 32 can have a multiple number of output port groupings, and each grouping is connected to a different PBX and, conversely, a PBX can be connected to a number of routers. FIG. 1 shows two trunk groupings from router 32 (one connected directly to PBX 25, and one connected to switch 231, to demonstrate that connection of a voice-enabled router 32 is not limited to a PBX (such as PBX 25).

In operation, when PBX 21 receives the telephone number of called party 15 and decides to route the call through packet network 100, router 31 identifies the trunk grouping at the output of router 32 that needs to be addressed, and addresses packets to that trunk grouping; i.e., to trunk grouping 34. When the packets arrive at router 32, they are converted to the format acceptable to PBX 25, directed to trunk grouping 34, and applied to PBX 25. The data thus provided to PBX 25 includes the called party's telephone number, and PBX 25 establishes a connection to telephone 15.

If the destination telephone (of the call made by telephone 11) is telephone 12, which is not behind a PBX, as is telephone 15, the principles of this invention still apply. Router 31 identifies that trunk grouping 35, the destination information is provided to switch 32, switch 32 routes the incoming call to switch 231 in domestic transport network 230, and through network 230 to switch 232, which establishes a connection to telephone 12. It is noted that since telephone 12 is not behind a PBX that can make decisions as to whether to complete a call using the PSTN network or the IP network, the operation is not symmetric; that is, calls initiated by telephone 11 can enjoy the benefits of this invention, but calls initiated by telephone 12 cannot.

This asymmetry can be rectified, of course, by embedding the decision-making capacity of PBXs 21 and 25 within switch 232.

It may also be mentioned that some, or all, of the telephones that can gain access to the FIG. 1 routers can be IP telephones, reducing the data conversion burdens of the voice-enabled routers.

One issue, of course, relates to the above-mentioned decision: when ought a call be established via network 100, and when via network 200. Cost and availability of a channel are the primary factors and, hence, it is desirable to provide a means for determining the effectiveness of the hard-wired split, i.e., the number of PBX 21 trunks that are connected to switch 211 and the number of PBX 21 trunks that are connected to interface circuitry 41.

SUMMARY OF THE INVENTION

An advance in the art is achieved with an arrangement that employs call detail records for developing a report on the usage of VoIP calling between equipment that connects to a packet network; for example, the peak simultaneous usage of a voice-enabled router connected to an IP network. By using information from call detail records (CDRs) such as a call-beginning record and a call-ending record, which contains call origin and destination information, a report is created of the number of concurrent VoIP calls that a specified equipment carries at any given time. This report is created by retrieving batches of stored call detail records, culling out the records that are relevant to the specified equipment and time interval, considering the culled records in a time sorted manner, and incrementing or decrementing a counter based on whether a considered record is a call-beginning record or a call-ending record, respectively. The state of the counter is reported, illustratively, as a line entry or bar chart, each time the counter's state is modified.

DETAILED DESCRIPTION

Figure 1:
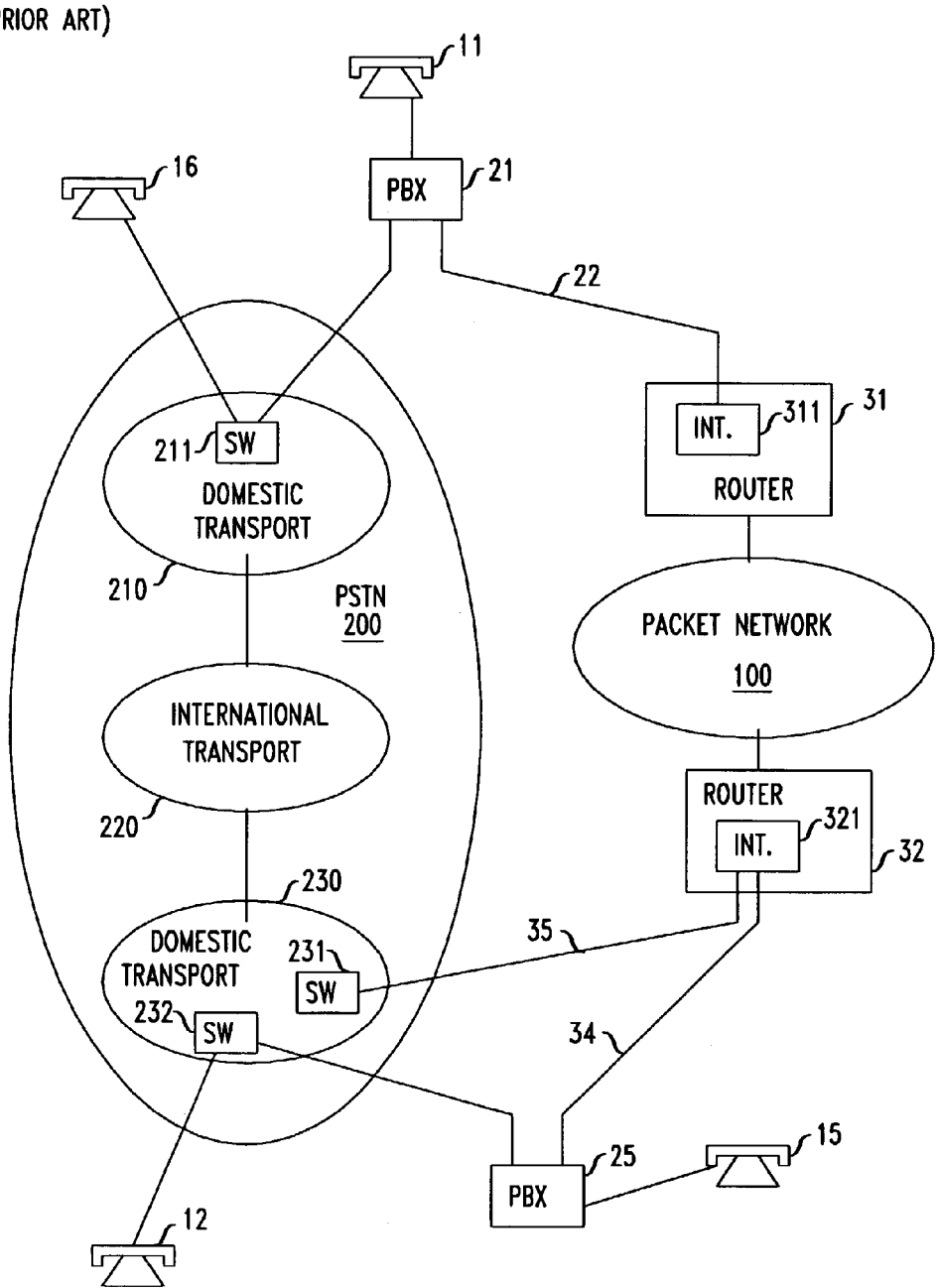
FIG. 1 presents a block diagram of an arrangement that permits voice calls to be carried by PSTN, or by a packet network.

Although FIG. 1 does not explicitly show it, it might be useful to point out that IP telephony, circa 2003, has an advantage over traditional telephony, in that, often, the costs for IP telephony are based on the provided capacity (i.e., the maximum number of simultaneous calls that can be carried by the provided channel—the restricted resource), rather than on "per minute" charges. In order to establish a packet flow between an input port of interface circuit 311 and an output port of interface circuit 321, one must establish a correspondence between the telephone number of the desired called party, i.e., the telephone number of telephone 15 is Sao Paulo, and the IP address of a router that has a trunk connection to PBX 25, i.e., the IP address of interface circuitry 321. Neither PBX 21 nor router 31 has this information. This information is available, however, to an entity whose business is to establish VoIP calls, and router 31 may, indeed, be under control of this entity. Thus, by accessing a database, router 31 obtains the tuple number of telephone 15: IP address of router 321.

In an arrangement where router 32 is also under control of an entity that provides VoIP, when a call establishment request that specifies the telephone number of telephone 15 in Sao Paulo is forwarded to router 32, interface circuitry 321 accesses a database, the latter identifies trunk grouping 34, and a packet flow is established. The VoIP provider charges for its service and also charges for the number of trunks that are connected from PBX 21 to router 31 (because the total number of interface circuits 31 that a router has is limited).

Figure 2:
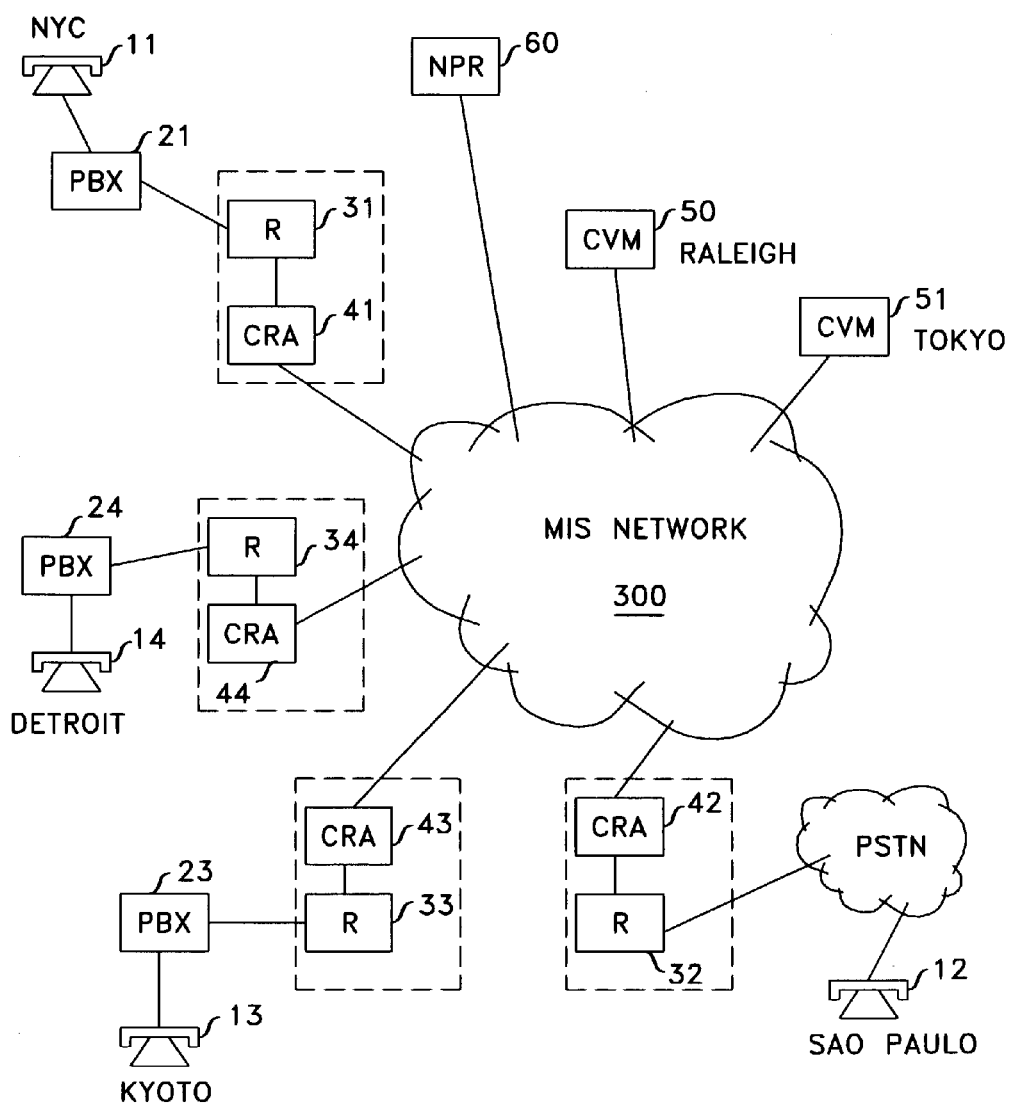
FIG. 2 depicts an arrangement that permits monitoring occupancy performance of elements in the packet network.

One issue that a business enterprise needs to resolve is what is the appropriate number of router-connected PBX trunks that should be acquired/leased. When the maximum number of VoIP channels are in use, any excess voice calls must be routed differently which, presumably, are more expensive options, such as the public switched telephone network (PSTN), cellular telephone systems, packet networks of other providers, etc. If the number of simultaneous VoIP calls that can be carried is much greater than actual usage, then the fixed costs are higher. The challenge in addressing this issue is to identify the load that is experienced by router-connected PBX trunks, so as to properly size the VoIP network FIG. 2 presents a block diagram of an arrangement that provides a means for determining the load that is experienced by equipment that is used for VoIP, such as the set of trunks that connects PBX 21 to interface circuitry 311. The FIG. 2 arrangement includes the elements found in FIG. 1 (though not all shown), and includes the additional elements of a Call Record Acquisition (CRA) module that s associated with each voice-enabled router. Illustratively, router 31 has an associated CRA 41, router 32 has an associated CRA 42, voice-enabled router 34 has an associated CRA 44 to which PBX 24 and telephone 14 (in Detroit) connect, and voice-enabled router 33 has an associated CRA 43 to which PBX 23 and telephone 13 (in Tokyo) connect.

Additionally, the FIG. 2 arrangement includes a Management Information System (MIS) network 300 from which all of the CRAs can be accessed, regional Cisco Voice Manager (CVM) servers that are connected to network 300, of which server 50 (in Raleigh) and server 51 (in Tokyo) are shown, and Network Performance Reporter (NPR) 60 that is also connected to network 300.

Operationally, call detail records (CDRs) are created within the CRAs. For purposes of this disclosure, the records may be created according to a number of algorithms. One algorithm, for example, creates a record at the beginning of an established call, and another record at the end of an established call, each with a flag that identifies the record as a call beginning record or as a call-ending record. These records can be considered together (combined physically, or merely logically) and treated as a single CDR tuple. Alternatively, a single record is created, at the time of a call's completion, identifying the call's start time, and its duration, as well as the call's origin and destination. Such a record can also be considered as a CDR tuple, from which two individual CDRs can be derived, if necessary. The former approach is employed herein; that is, each CRA creates a record at the beginning of a call that comprises a call ID that identifies the telephone that is involved in the call (for charging purposes), and information about equipment that is interposed between the telephone and the voice-enabled router, time of day in a preselected time zone, e.g., GMT time, and a +1 flag (to indicate call commencement); and a record at the end of a call that comprises the same call ID, the time of day, and a −1 flag (to indicate call termination).

It may be noted that each call has an originating point with its associated router, and a destination point with its associated router. Since a sense of the number of concurrent established calls is independent of whether a router carries a call by virtue of it the originating point's router, or by virtue of it being the destination point's router, it follows that each call engenders two CDRs; one relative to the originating router (e.g., 31), and one relative to the destination router (e.g., 32). In this manner, a report can be created that reveals the number of concurrent established calls at each router.

At times it may be desirable to create a report that identifies the number of concurrent calls that exist between two selected routers. To provide for such a report, each CDR carries an ID that relates to the call itself, which results in a CDR of a call at the originating router having the same ID (or a portion thereof) as the ID of the CDR of the same call at the destination router. To give a mere example, the ID, or a portion of the ID might comprise the concatenation of the originating telephone's number and the terminating telephone's number.

The records created in the CRAs are communicated to prearranged regional CVM servers by having each regional CVM server poll a predetermined set of CRAs. For example, CVM 50 polls all of the CRAs in the United States, and CVM 51 polls all of the CRAs in Japan. The polling is carried out periodically, for example, every hour, and the CDRs that are collected by the polling process are forwarded, also periodically, to NPR 60; for example, once a day. NPR 60 analyzes the data and creates reports, such as disclosed below.

Figure 3:
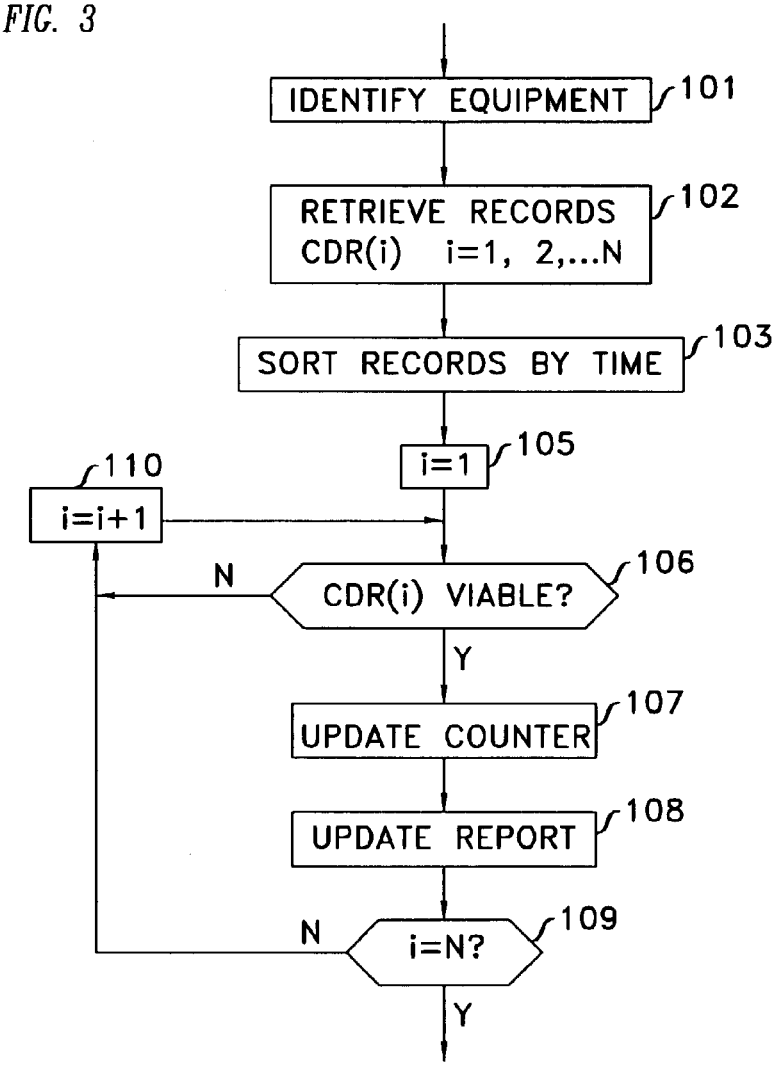
FIG. 3 presents a flowchart of a process for monitoring the occupancy performance.

In order to determine the VoIP load relative to a particular piece of equipment, a process not unlike the one depicted in FIG. 3 may be executed, for example, in NPR 60. Here, too, numerous methodologies may be employed. For example, a report for each piece of equipment may be updated each time a batch of data is delivered to NPR 60. Alternatively, a report may be created for a given piece of equipment, and for a selected period of time, on an "as needed" basis.

In connection with the second method, where a report is created on an "as needed basis," data is retrieved from the storage means within NPR 60 when a report is requested. Obviously it is desirable to retrieve as little data as is necessary, but in embodiments where two CDRs are created for each call (a call-beginning CDR, and a call-ending CDR) a problem arises in that whatever instance is selected at the initial point in time from which data is retrieved, there are conversations in progress, so one might need to back-up in time. This problem is overcome herein by noting that data is retrieved by the regional CVM servers from the CRAs in batches, that data is obtained by the NPR in batches (albeit, not necessarily the same time-interval batches), and by observing that obtained data can be stored by the NPR in batches that are augmented to accommodate the need for having call-beginning CDRs for all calls that are active at the time corresponding to the beginning of a stored batch. The size of these augmented batches (i.e., their start and end times) need not be related to either the batches retrieved from the CRA, or the batches sent to NPR 60. However, it may be convenient for NPR 60 to augment the batches received by NPR 60 as they arrive and are stored in a storage means within NPR 60.

The important point to note is that whatever batch storing granularity is employed, a number of virtual call-beginning records need to be included at each batch storing time to account for calls that are in progress at the beginning of the considered batch.

To illustrate, assume that NPR 60 polls the set of CVM once a day (e.g., at 0:00 GMT), and assume further that the batch granularity selected for NPR 60 is also 24 hours, synchronized to the daily receipt of data at NPR 60. When NPR 60 obtains a set of CDRs, for example at 0:00 GMT of Sep. 12, 2002, it passes the received records through a checkpoint in their way to storage as batch 09122002. Each call-beginning CDR that passes the checkpoint is copied into a checkpoint buffer, and each call-ending CDR that passes the checkpoint erases from the checkpoint buffer the corresponding, previously copied, call-beginning CDR. Thus, when the storage of batch 09122002 is complete, the checkpoint buffer contains a copy of the CDR records of calls that began (actually, or virtually) during batch 09122002 but did not terminate. At the next batch storing process, that is, when batch 09122002 CDR records are stored, the records stored in the checkpoint buffer are pre-pended to batch 09132002. These are the aforementioned virtual call-beginning records that augment the batch stored for Sep. 13, 2002; i.e., stored for batch 09132002.

It may be noted briefly that the other method for creating CDR tuples, where each tuple comprises the end time and a duration, there is no need to augment the stored batch because a call-beginning CDR can be created for each encountered call-ending CDR, but this approach has a finite likelihood of errors, which arise from calls that began prior to the time interval of interest but do not end within the time interval of interest.

FIG. 3 presents an illustrative process for determining the VoIP load, during any chosen time interval. At step 101 one identifies the equipment relative to which the analysis is performed, and in step 102, which follows, a collection of CDR batches is retrieved from the storage means of NPR 60, corresponding to the desired analysis time interval. The collection of batches, which encompasses both the start time of the interval of interest and the end time of the interval of interest, can be viewed as a single set of records CDR(i), i=1,2, . . . N, where N is the total number of records in the collection of batches. Control then passes to step 103, which sorts the records by time of call beginnings, and thence to step 105, which sets index i to 1 and passes control to step 106. Step 106 ascertains whether the CDR(i) record pertains to the equipment specified in step 101. If not, control passes to step 110, which increments index i and returns control to step 106. Otherwise, control passes to step 107, which updates a counter. Specifically, if the CDR flag is a +1, step 107 increments the counter, and if the CDR flag is a −1, step 107 decrements the counter. Control then passes to step 108, which creates a line entry in a report that specifies the count value of the counter and the time of the CDR record that updated the counter. Control then passes to step 109, which returns control to step 110, unless it determines that all of the retrieved records were considered.

Figure 4:
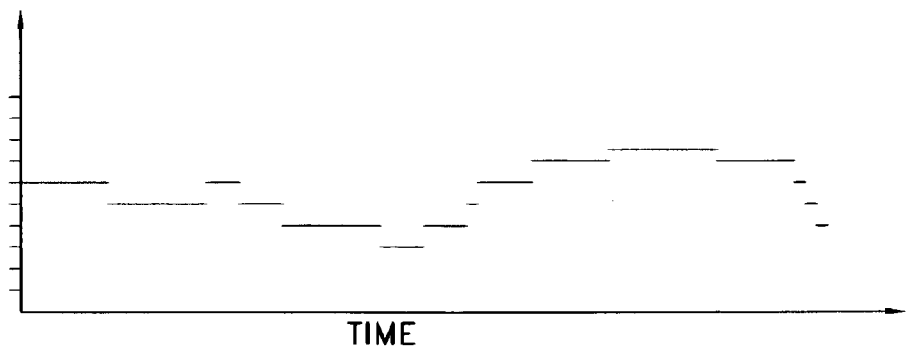
FIG. 4 gives a graphical example of a report created by the FIG. 3 process.

Data that is generated by the step 108 report, when presented graphically, appears like an amplitude-quantized signal with number of concurrent calls on the ordinate, and time on the abscissa, not unlike what is depicted in FIG. 4. The discontinuities along the abscissa occur at times of call beginnings and call-endings. Various parameters can be easily derived from this data, such as the number of concurrent calls at a specified time, the average number of concurrent calls, the maximum and minimum number of concurrent calls, standard deviation, etc. In other words, the object of this disclosure to provide a means for informing customers about the efficacy of their contract for a given number of trunks from, for example, PBX 21 to router 31 is clearly achieved. Knowing, for example, the average number of these trunks that are occupied at any one time, or the pattern of usage, can enable customers to more effectively utilize their communications budget. This can take the form of contracting for more trunks, contracting for fewer trunks, adding, or subtracting destinations to which PBX 21 tries to connect via network 100, or even controlling the set of these destinations based on time of day. For example, PBX 21 may be set to assign a larger number of destinations to VoIP mode calls before 9 AM and after 4 PM, then during the peak workday usage.

A skilled artisan would realize that the disclosed process for monitoring the number of concurrent calls that pass through a piece of equipment is limited solely by the information contained in the call ID field, and that various modifications can be made to the field, or other fields of the CDRs to provide additional capabilities. It should also be realized that while it is NPR 60 that creates the reports in the above-disclosed arrangement, that is not a requirement. For example, each one of the CVMs can be assigned the task of creating reports. Of course, if a report is desired for the entire network, covering more than one region, then it is more convenient to use NPR 60 to create the necessary report. Still further, it should be realized that the process depicted in FIG. 3 first sorts records and then culls out the relevant ones, but the process can be reversed; that is, have the records culled first, and then sorted. Lastly, it may be pointed out that the CDRs are created not only at the CRA of the calling party's router, but also at the CRA of the called party's router, independently of who pays for the calls.

What is claimed is:

1. A method for developing a report relative to a specified piece of equipment of a network, or network path of said network, comprising the steps of:
   collecting call detail records (CDRs) having an identifier that permits segregating call detail records based on said specified piece of equipment or network path, which call detail records are adapted to yield call-beginning information, or call-ending information or both;
   conditioning said collected CDR by employing a process of culling CDRs that pertain to said specified piece of equipment or network path, and a process for permitting said CDRs to be considered in time-ordered manner, said conditioning executing said processes in any chosen order; and
   employing the conditioned CDR, considered in time-ordered manner, to update a count state;
   where said step of employing increments a counter when a considered CDR provides call-beginning information, and decrements said counter when said considered CDR provides call-ending information.

2. The method according to claim 1 where said step of employing further comprises a step of entering count value of said counter in a report.

3. The method according to claim 2 further comprising a step of analyzing data presented by said report.

4. The method according to claim 3 further comprising a step of analyzing delivering results of said step of analyzing.

* * * * *